United States Patent
Jovanovich et al.

(10) Patent No.: US 8,767,768 B2
(45) Date of Patent: Jul. 1, 2014

(54) DATA PATH DIFFERENTIATOR FOR PRE-EMPHASIS REQUIREMENT OR SLOT IDENTIFICATION

(75) Inventors: Alan Frank Jovanovich, Costa Mesa, CA (US); Stephen Eugene Holness, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 1 day.

(21) Appl. No.: 13/166,691

(22) Filed: Jun. 22, 2011

(65) Prior Publication Data

US 2011/0249570 A1    Oct. 13, 2011

Related U.S. Application Data

(63) Continuation of application No. 11/369,326, filed on Mar. 6, 2006, now Pat. No. 8,004,997.

(51) Int. Cl.
*H04L 12/66* (2006.01)

(52) U.S. Cl.
USPC ........................................ 370/463

(58) Field of Classification Search
USPC .............. 370/463, 469–472, 474–6; 375/152, 375/349, 350, 229–239; 710/1–4, 62
See application file for complete search history.

(56) References Cited

U.S. PATENT DOCUMENTS

| | | | | |
|---|---|---|---|---|
| 4,553,248 A * | 11/1985 | Reed | | 375/232 |
| 5,708,703 A * | 1/1998 | Nagaraj | | 379/340 |
| 5,857,087 A | 1/1999 | Bemanian et al. | | |
| 6,236,726 B1 * | 5/2001 | Darveau | | 379/417 |
| 6,625,255 B1 | 9/2003 | Green et al. | | |
| 6,647,117 B1 | 11/2003 | Wallace et al. | | |
| RE40,038 E | 1/2008 | Shakiba | | |
| 7,353,435 B2 * | 4/2008 | Matsushige et al. | | 714/699 |
| 8,004,997 B2 | 8/2011 | Jovanovich et al. | | |
| 2002/0143485 A1 | 10/2002 | Chen et al. | | |
| 2004/0145879 A1 * | 7/2004 | Hensley et al. | | 361/788 |
| 2009/0031014 A1 * | 1/2009 | Chu et al. | | 709/222 |

* cited by examiner

*Primary Examiner* — Mark Rinehart
*Assistant Examiner* — Peter Cheng
(74) *Attorney, Agent, or Firm* — McAndrews, Held & Malloy, Ltd.

(57) ABSTRACT

An apparatus and method is disclosed for generating path length information for two (usually redundant) receive paths in a receiving device such as a server blade so that the proper amount of equalization and/or pre-emphasis may be applied to receiver and driver circuits in the server blade. In one embodiment, the path length information comprises a longer or shorter path determination, and may also include a estimation of the slot location. In another embodiment, the path length information comprises a representation of the length of two receive paths. The path length information generating circuit is connected to the two receive inputs of the receiving device though high impedance elements, and the path length information may be utilized by hardware or a processor to set the equalization or pre-emphasis in the receiver and/or driver.

26 Claims, 5 Drawing Sheets

DATA PATH DIFFERENTIATOR FOR PRE-EMPHASIS REQUIREMENT OR SLOT IDENTIFICATION

CROSS-REFERENCE TO RELATED APPLICATIONS

This application is a continuation of U.S. patent application Ser. No. 11/369,326, filed Mar. 6, 2006, now U.S. Pat. No. 8,004,997 the entire disclosure of which is incorporated herein by reference in its entirety for all purposes.

FIELD OF THE INVENTION

This invention relates to communications between devices within blade servers, and more particularly in one embodiment, to an apparatus for automatically identifying and/or estimating the lengths of data paths between redundant interface devices and one or more Input/Output Controllers (IOCs) within the blade server to assist in equalizing the frequency response of those data paths.

BACKGROUND OF THE INVENTION

Figure 1:
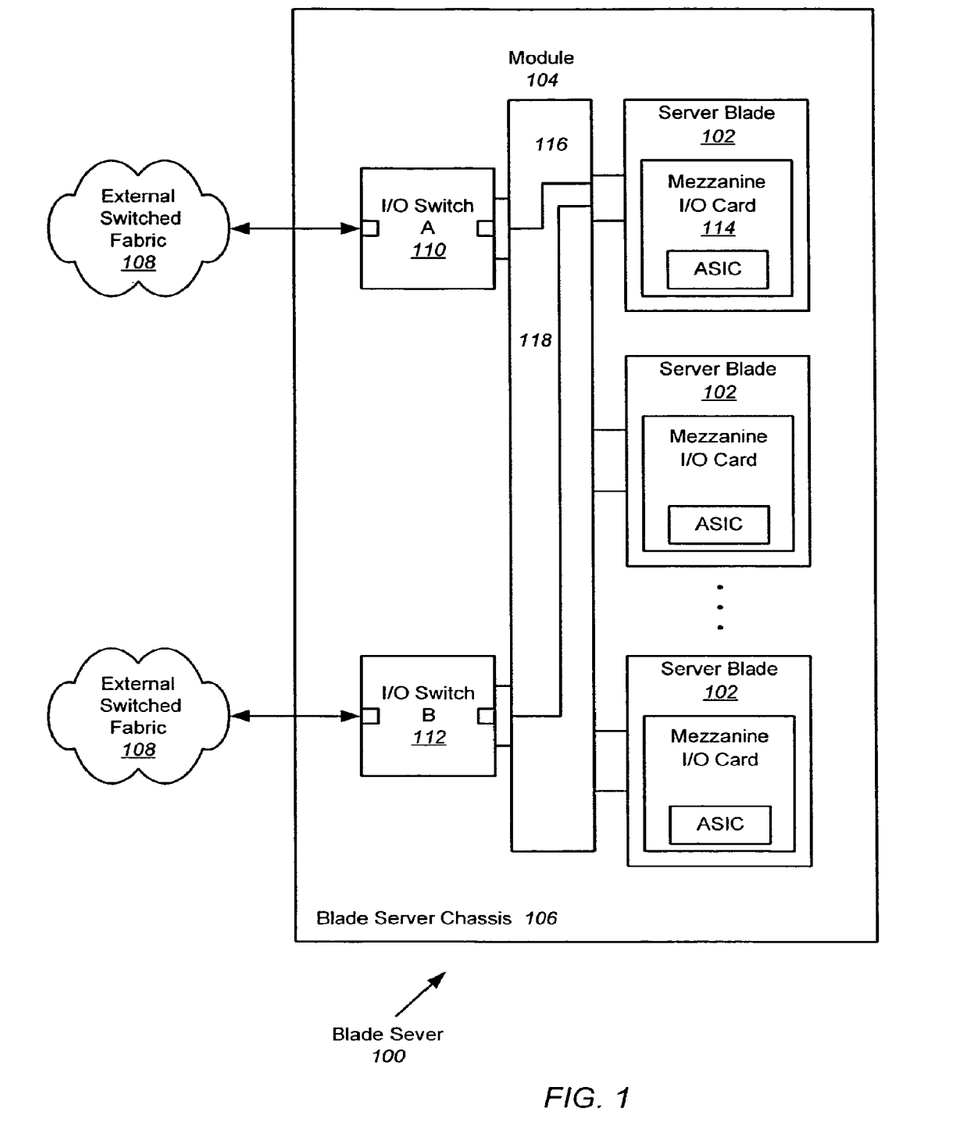
FIG. 1 is an illustration of an exemplary conventional blade server connected to an external switched fabric.

FIG. 1 is an illustration of an exemplary conventional blade server 100 connected to an external switched fabric 108. Blade servers overcome some of the inefficiencies of individual standalone or rack-mounted One Unit (1U) high servers, each of which is self-contained and includes separate power supplies, fans, and the like, and are therefore inefficient in terms of space, power, cooling, and other characteristics. Blade servers 100 utilize a modular, plug-in approach wherein the housing for each server is eliminated along with self-contained components such as power supplies and fans. Each previously standalone server is therefore reduced to a server "blade" 102 capable of being plugged into a backplane or midplane 104 within the blade server chassis 106 from the front of the chassis. Typically, two to 14 blades may be installed in a single blade server chassis 106. The midplane 104 contains connectors for receiving the server blades 102 and typically contains from one to four "lanes" or paths on a Printed Circuit Board (PCB) for carrying high-speed data signals. The midplane 104 therefore eliminates much of the cabling that was required with individual servers. The blade server chassis 106 also provides redundant common cooling and power to the server blades 102 through the midplane 104.

Conventional blade servers 100 may be connected to redundant external switch fabrics 108 through interface cards such as an "A" side Input/Output (I/O) switch 110 and a "B" side I/O switch 112, which plug into the midplane 104 from the back of the chassis 106. Typically, the redundancy enables one switch to take over if the other fails. Alternatively, in Switched Bunch Of Disk (SBOD) or Just a Bunch Of Disks (JBOD) implementations, a blade server may comprise multiple disk drives contained in SBODs or JBODs connected to the backplane through an interface card without a connection to the network, instead of the I/O switches 110 and 112 shown in FIG. 1. In a typical SBOD, the server blades 102 have an I/O port directly on them, and talk to the drives over the midplane.

The blade server midplane 104 is typically rooted/designed to allow for one or more independent redundant fabrics or I/O protocols, such as Fibre Channel (FC), Ethernet or Infini-Band. In the case of a FC configuration, each embedded switch 110 and 112 may be a FC Arbitrated Loop (FC_AL) switch or a full fabric switch, with a separate port to connect to each of the multiple server blades 102 (but shown connected to only one server blade 102 in FIG. 1) over a FC link 116 or 118, and output ports for connecting to the external switched fabrics 108.

To enable the server blades 102 to communicate with the switch fabric, a mezzanine I/O card 114 that performs a Host Bus Adapter (HBA) (a.k.a. IOC) function is typically required in each server blade 102. These mezzanine I/O cards 114 may be mounted to the server blades 102 as daughter cards. Alternatively, an IOC may be mounted directly on the server blade. For purposes of this specification, mezzanine I/O cards 114, referred to herein, include both daughter cards and IOCs mounted directly onto the server blade. The connections to the mezzanine I/O card 114 include the two I/O links 116 and 118 routed from each of the two embedded switches 110 and 112 through the midplane 104. The mezzanine I/O cards 114 follow the standard device driver model, so that when a server blade 102 with a mezzanine I/O card 114 is plugged into the midplane 104 and connected to an embedded switch 110 or 112, it appears to be a standalone server communicating with an external switch. Note that switches 110 and 112 in FIG. 1 may alternatively be replaced with "pass-through" transceiver cards.

Depending on where the I/O switches 110 and 112 are plugged into the midplane 104, and where the server blades 102 are plugged into the midplane, the redundant data paths 116 and 118 may be drastically different in length, very similar in length, or anywhere in between. Given the conventional implementation of a blade server 100 as illustrated in FIG. 1, or alternatively in SBOD or JBOD implementations or any backplane/midplane system with redundant data paths, the different lengths will cause each of the two redundant data paths 116 and 118 to have different and distinguishable losses at all frequencies, provided impedance matching of the system is maintained to a reasonable degree. These differences may cause transmission errors and unacceptable error rates, among other things.

In some legacy blade servers, the driver circuitry generates the best signal possible, and the receiver circuitry simply receives the transmitted signals with differences in attenuation, however large or small, as influenced by the path lengths. However, because frequencies and data rates have increased, resulting in higher signal attenuation, especially at the upper (higher) frequencies of the data signal (and hence more deterministic jitter), conventional modern systems may employ transmitter circuits with pre-emphasis on their transmit outputs in an attempt to transmit data with an enhanced frequency response in order to receive a flat frequency response at the far or "receiving" end, and achieve acceptable bit error rates.

Figure 2:
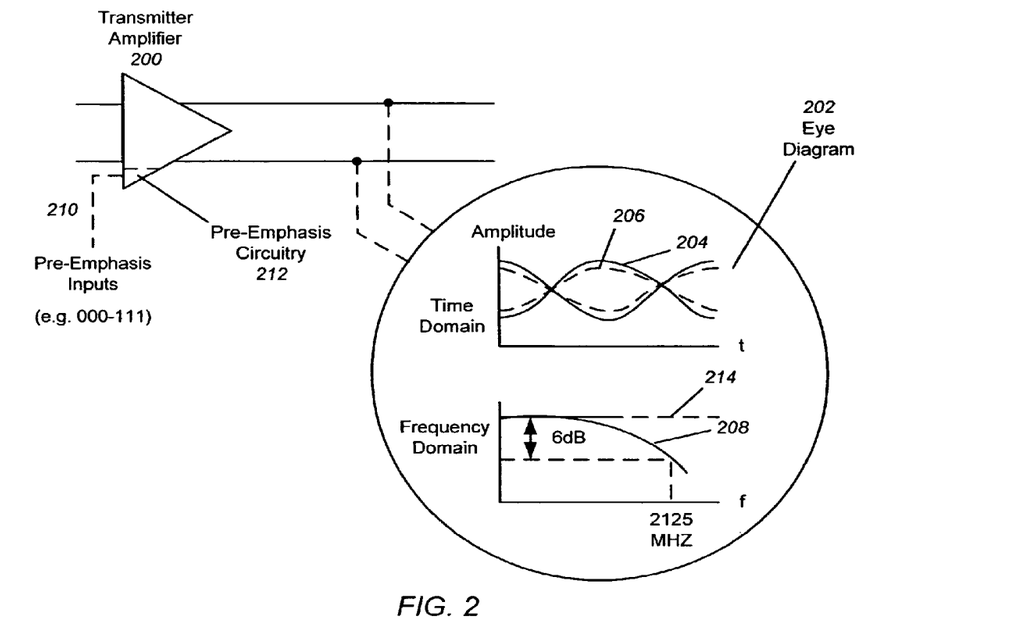
FIG. 2 is an illustration of an exemplary amplifier in a transmitter circuit and its corresponding output "eye" diagram in the time domain and rolloff in the frequency domain.

Referring to FIG. 2, a standard amplifier 200 in a transmitter circuit generates an output "eye" diagram 202 in the time domain. At lower frequencies, the transmit signal peak-to-peak amplitude may be substantial as indicated at 204, but at higher frequencies, the transmit signal peak-to-peak amplitude may be less substantial as indicated at 206, and the eye will get progressively smaller. In the frequency domain, the higher frequencies taper off in amplitude, as indicated at 208. Given a 4.250 Gbit/sec signal, at 2125 MHz the amplitude may taper off by 6 dB, half the original voltage or more. Because of the rolloff of the amplifier at high frequencies, the eye in the time domain closes at those frequencies, and data can no longer be accurately transmitted with acceptable error rates, if at all.

To compensate for this frequency domain rolloff, programmable pre-emphasis circuitry can be added to the amplifiers to give the amplifier an equivalent boost at the higher frequencies. For example, firmware and registers can be employed to control the amount of boost (de-emphasis) by communicating a 3-bit word (e.g. 000 to 111) 210 to pre-emphasis circuitry 212 within the amplifier, which is well-understood by those skilled in the art. The pre-emphasis circuitry 212 is adjustable and provides internal compensation to compensate for the path so that the frequency response at the receiving end becomes relatively flat over all frequencies (see reference character 214), which is desirable. However, even though the true definition of pre-emphasis is boosting of the higher frequencies, the transmit amplifier is limited by its supply voltages. For example, if the transmit amplifier is supplied by a 3 volt rail, the eye cannot be more than 3 volts high (at which point "rail-out" occurs), and thus even with pre-emphasis the output amplitude cannot be more than 3 volts. Therefore, rather than boost the higher frequencies to above 3 volts, which is not possible, pre-emphasis circuitry actually maximizes the output at the upper frequencies (e.g. 2125 MHz) towards the upper rail (e.g. +3V), and de-emphasizes the lower frequencies to create the relatively flat frequency response. Depending on the bandwidth of the amplifier, the amplitude of the resultant eye will roughly correspond to the amplitude at which the rolloff occurs after equalization.

Alternatively or in addition to transmit circuit pre-emphasis, conventional modern systems may also have IOC integrated circuits with equalizers on their receiver inputs, or equalizer circuits external to and ahead of the IOC integrated circuits, to customize the frequency response for a particular path and equalize the redundant data paths so that they have approximately the same frequency response over a given frequency range.

Figure 3:
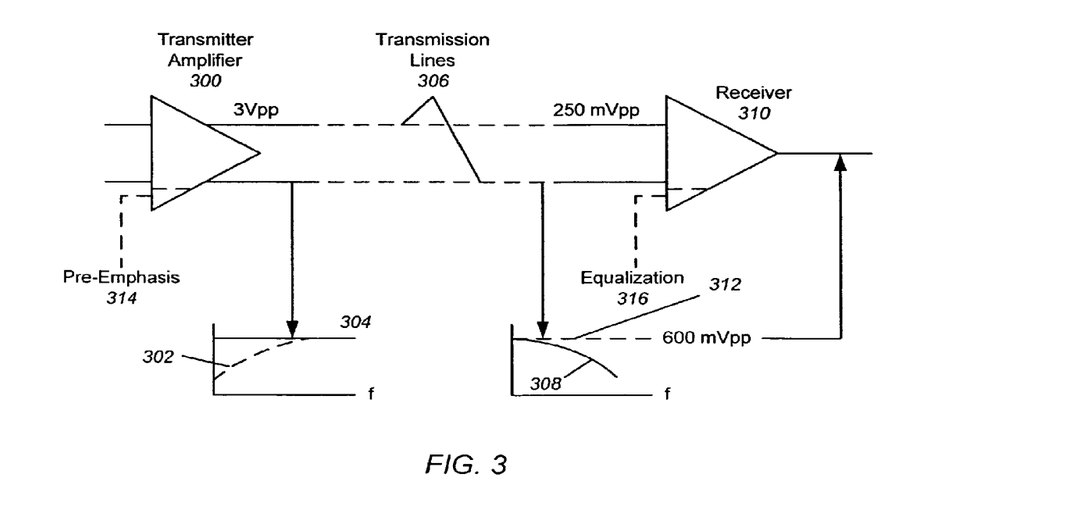
FIG. 3 is an illustration of an exemplary transmit amplifier and its compensated frequency response using pre-emphasis and an exemplary receive amplifier and its compensated frequency response using equalization.

Referring now to FIG. 3, at the transmitter end 300 pre-emphasis 314 may be used as described above to de-emphasize the lower frequencies (see reference character 302) to flatten out the frequency response as seen at the receiving end. However, after the signal passes through the transmission lines 306 in the midplane of the blade server, rolloff (see reference character 308) once again occurs at the higher frequencies at the receive end 310, and the signal level may be much lower (e.g. 250 mV peak to peak), which is not near any rail. If the transmitter cannot pre-emphasize enough to substantially reduce receive end rolloff, equalization 316 may be applied to the receive end to boost the higher frequencies with gain to raise the signal level of all frequencies, and flatten out the frequency response (see reference character 312) to some predetermined level acceptable to the receive end circuitry (e.g. 600 mV peak to peak).

Ideally, the amount of equalization and/or pre-emphasis applied to each transmit amplifier or receiver would be customized for the length of the path. Some modern conventional midplanes and devices do have some form of slot identification or path length determination built into their hardware. Slot identification typically requires either dedicated pins on interface connectors or semiconductors (such as Electrically Erasable Programmable Read Only Memories (EEPROMs)) to be designed into the original Backplane/Midplane.

However, in order to save on costs, companies also desire to re-use previous designs whenever possible, especially backplanes and midplanes already in service at customer sites that do not have slot identification. Without slot identification, it is difficult to determine the proper pre-emphasis and/or equalization settings for the path loss (link budget) at the faster data rates. Too much pre-emphasis or equalization will have the same effect as too little pre-emphasis or equalization, resulting in a higher bit error rate and less than optimized performance. Therefore, when a device such as a server blade is plugged into the midplane, either human assessment and intervention is required to determine the slot location, approximate the path lengths, and apply a custom amount of pre-emphasis and/or equalization to the transmit and receive circuits, or alternatively, a fixed "compromise" amount of pre-emphasis and/or equalization for an average path length is applied that hopefully works for both paths regardless of where the device is plugged into the midplane. The former approach is often not practical, and the latter approach may result in some slots having overdriven signals and others having underdriven signals, resulting in unacceptable error rates and the need for complicated gain control circuitry.

Therefore, there is a need to automatically identify and/or estimate the lengths of data paths between redundant interface devices and one or more IOCs within the blade server to assist in equalizing the frequency response of those data paths, without requiring dedicated pins on interface connectors or semiconductors designed into the midplane.

SUMMARY OF THE INVENTION

Embodiments of the present invention are directed to an apparatus and method for generating path length information for two (usually redundant) receive paths in a receiving device such as a server blade so that the proper amount of equalization and/or pre-emphasis may be applied to receiver and driver circuits in the server blade. In one embodiment, the path length information comprises a longer or shorter path determination, and may also include a estimation of the slot location. In another embodiment, the path length information comprises a representation of the length of receive paths. The path length information generating circuit is connected to the two receive inputs of the receiving device though high impedance elements, and the path length information may be utilized by hardware or a processor to set the equalization or pre-emphasis in the receiver and/or driver.

Embodiments of the present invention assume that the driver circuits in each of two redundant transmitting devices contain the same driver circuitry or adhere to the same standard for voltage output levels, such that the driving voltages should be within some reasonable range of each other. The driver outputs from the two transmitting devices travel a shorter path and a longer path within a midplane or backplane, where, due to copper and dielectric losses in the transmission lines, the frequencies in the long path are more highly attenuated than the frequencies in the short path.

When the transmission lines for these two paths enter the receiving device, they are routed to a receiver, typically a SERializer/DESerializer (SERDES). Near the receiving device, the transmission lines are sampled differentially by high impedance elements.

In the embodiment mentioned above in which the path length information generating circuit will give an indication as to whether the receiving device is inserted near the center of the midplane (or any location in the range of slot locations as identified by a threshold value) and which paths are the longer and shorter paths, the high impedance elements feed a differential amplifier for each data path to bring the signal to a usable level and to convert it into a single ended signal, thereby simplifying and reducing requirements for further stages. These amplifiers will typically have the same gain or amplification level.

Once amplified, the signals are fed into filters, which may be high pass filters or bandpass filters, depending on the data encoding and the high frequency components of the data being received. At high frequencies, where the long paths have significant loss as compared to the short paths, it is easier to compare the two paths. Thus, the filters may be bandpass filters that only pass frequencies at a selected high frequency.

The energy at those frequencies will pass through the filters and charge up envelope detectors. The output of the envelope detectors is a DC voltage equivalent to the peak value of the amplitude of the data frequency component desired. At this point, the path with the largest loss (the long path) will have significantly less voltage amplitude than the short path.

The two peak voltages from each of the envelope detectors are fed into a comparator, whose output provides an indication of which of the paths is the most highly attenuated, and therefore, which is the longer path. In particular, if the output of the comparator is a high voltage, the path connected to the + input of the comparator is the shorter path, and if the output is a low voltage, the path connected to the − input of the comparator is the shorter path.

To provide a better estimation of actual path lengths, the outputs of the envelope detectors can also be fed into a differential amplifier to amplify and scale the difference in the paths. If the receiving device is in a slot near the end of the midplane, the two paths are more likely to be significantly different in length, and the output of the differential amplifier is more likely to be large as compared to when the receiving device is inserted into a middle slot and the paths are more likely to be closer in length.

Setting a threshold on a second comparator and comparing it to the output of the differential amplifier can also provide an indication of the location of the receiving device as compared to the location represented by the threshold.

Once the longer and shorter path determination and the relative position determination has been made, this information may be converted to a digital value using an Analog to Digital (A/D) converter and can be used by hardware and/or a processor to set pre-emphasis settings for transmitters in the return paths of the receiving device (which may be the same as the receive path lengths), and/or equalizer settings for the receive path equalizers. Alternatively, instead of providing the relative position determination (output of the second comparator) to the hardware or processor, the output of the differential amplifier may be converted using an A/D converter and provided to the hardware or processor for making the relative position determination and pre-emphasis settings. This embodiment does not enable perfect equalization/pre-emphasis, but provides an approximate indication of where the receiving device is plugged into the midplane so the hardware and/or processor can set the equalization with some level of intelligence.

In the embodiment mentioned above in which the path length information comprises a representation of the length of receive paths, slot identification circuitry is disclosed that takes advantage of the fact that interface boards such as I/O switches are plugged into fixed positions in the midplane and connect to receiving devices such as controller cards or server blades via known fixed-length paths. Because the path length information is known, a path length or slot position indicator can be sent to the receiving devices in the form of a unique common mode DC voltage across the FC (or other high speed serial interface) transmission lines, allowing that device to know its path length or slot location so that it can determine pre-emphasis and or equalizations settings best suited for that path.

In this second embodiment, after the signals are sampled differentially by high impedance elements, the sampled signals are fed into low pass filters. The output of each filter is the applied common mode DC voltage representing the length of that particular path. The DC voltages may be converted to digital values using A/D converters and can be used by hardware and/or a processor to set pre-emphasis settings for transmitters in the return paths of the receiving device and/or equalizer settings for the receive path equalizers.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention may be described herein primarily in terms of FC signaling, it should be understood that the present invention is not limited to FC, but includes InfiniBand, Ethernet, Serial Attached Small Computer System Interconnect (SAS), Serial ATA (SATA) signaling and the like. Implementation of these protocols requires that the midplane support the protocol.

Figure 4:
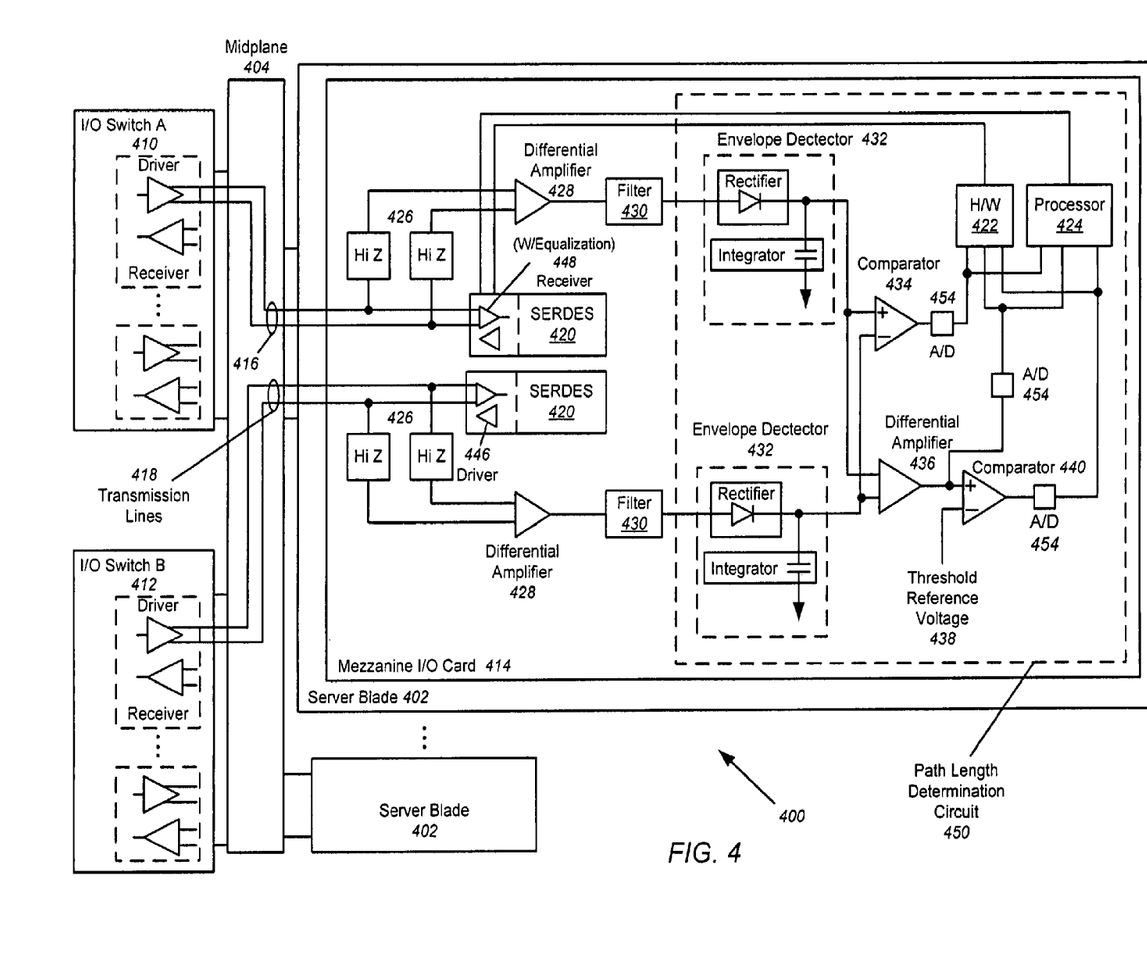
FIG. 4 is an illustration of an exemplary blade server with a mezzanine I/O card employing a path length and slot estimation circuit according to embodiments of the present invention.

FIG. 4 is an illustration of an exemplary blade server 400 with multiple server blades 402, each server blade including a controller, host interface card, HBA, or IOC, and each server blade employing a path length and slot estimation circuit according to embodiments of the present invention. However, it should be understood that embodiments of the present invention are generally applicable to any system comprising two transmitting devices that transmit signals over a longer path and a shorter path to a receiving device. In the example of FIG. 4, server blades 402, an interface card such as an "A" side I/O switch 410 and a "B" side I/O switch 412 are plugged into a midplane 404 within a blade server chassis. It should be understood that in SBOD or JBOD implementations, a blade server may comprise multiple disk drives instead of the multiple server blades 402 shown in FIG. 4.

To enable the server blades 402 to communicate with a switch fabric through the redundant I/O switches 410 and 412, a mezzanine I/O card 414 that performs an HBA (a.k.a. IOC) function may be employed in each server blade 402. The connections to the mezzanine I/O card 414 include two differential I/O links (transmission lines) 416 and 418 routed from each of the two redundant I/O switches 410 and 412 through the midplane 404. Note that although only the mezzanine I/O card receive paths 416 and 418 are illustrated in FIG. 4 for simplicity, the mezzanine I/O card 414 may also include drivers 446 and transmit paths (not shown) for sending signals to the redundant I/O switches 410 and 412. In addition, although FIG. 4 illustrates differential signals, embodiments of the present invention are also applicable to single-ended signals.

In the example of FIG. 4, redundant I/O switches 410 and 412 contain the same driver circuitry or adhere to the same standard for voltage output levels, such that the driving voltages are within some reasonable range of each other. The driver outputs from each I/O switch 410 and 412 travel the short path 416 and the long path 418, respectively, where, due to copper and dielectric losses, the frequencies in the long path are more highly attenuated (e.g. 10 dB loss) than the frequencies in the short path (e.g. 2 dB loss). More importantly, the higher frequency components of the data signal will be attenuated the most, causing a much larger difference in attenuation between the short and long paths than at the lower frequencies where both copper and dielectric losses are small. After the transmission lines 416 and 418 for these two paths enter the mezzanine I/O card 414 on the server blade 402, they are routed to a receiving circuit, typically a SERializer/DESerializer (SERDES) 420.

The path length and slot estimation circuit according to embodiments of the present invention is shown surrounding the SERDES 420 in the example of FIG. 4. Although the path length and slot estimation circuit is shown in FIG. 4 within the mezzanine I/O card 414, it may be located in other locations on the server blade 402 or receiving device. The path length and slot estimation circuit will give an indication as to whether the receiving device (e.g. server blade 402) is inserted near the center of the midplane 404 (or any location in the range of slot locations as identified by a threshold value) and which paths are the longer and shorter paths. With this information, other hardware 422 or a processor 424 operating under the control of firmware may control an equalization circuit in the receivers 448, well-understood by those skilled in the art, to flatten out the frequency response of the received signals. The equalization may be built into the receiver 448 in the SERDES 420, as shown in FIG. 4, or may be external to the SERDES.

Near the receiver 420 (how near depends on the data rate and frequencies involved) the transmission lines 416 and 418 are sampled differentially by high impedance elements 426. Note that the high impedance elements 426 must be placed before the equalization circuitry 448. These high impedance elements 426 are high enough impedance as compared to the impedance of the transmission lines 416 and 418 (on the order of 10× or more) so as to sample the data stream, but not disturb the data being received.

Figure 5:
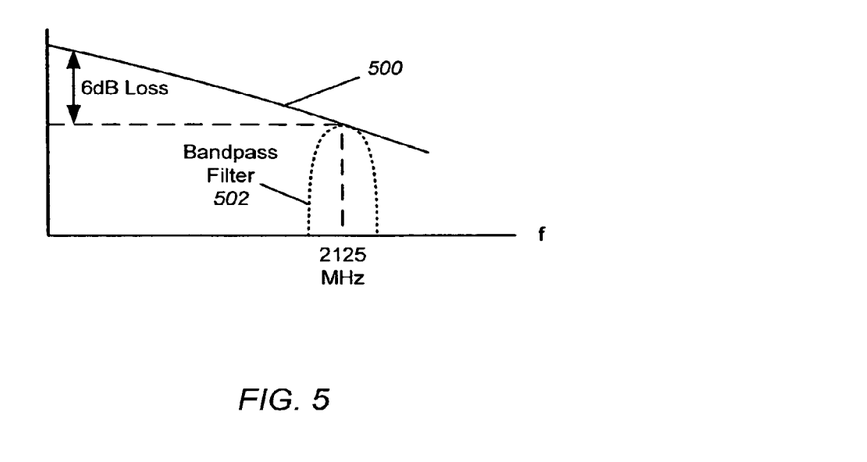
FIG. 5 is an illustration of an exemplary receiver and its rolled-off frequency response and a bandpass filter at the higher frequencies for use in determining path length and slot estimation according to embodiments of the present invention.

The high impedance elements 426 feed a differential amplifier 428 (in the case of differential signals) for each data path to bring the signal to a usable level and to convert it into a single ended signal, thereby simplifying and reducing requirements for further stages. These amplifiers 428 will typically have the same gain or amplification level. If the redundant data paths are single-ended, a differential amplifier is not needed, and if the signal levels are high enough, no amplifier may be needed. FIG. 5 illustrates the frequency response 500 of the long transmission line path 418 of FIG. 4 after amplification by amplifier 428. Note that in FC embodiments, at high frequencies around 2125 MHz, the amplitude has dropped by 6 dB (could be 0 dB to 14 dB, typically).

Referring again to FIG. 4, once amplified, the signal is fed into a filter 430, which may be a high pass filter or bandpass filter well-understood by those skilled in the art, depending on the data encoding and the high frequency components of the data being received. The filter 430 can be comprised of discrete components or implemented on a printed circuit board using microwave filter techniques in order to keep the cost of the implementation low.

The design of the filter 430 may be dependent on the communication protocol. For example, the FC protocol allows only up to five zeroes in a row before a one must be inserted, or up to five ones in a row before a zero must be inserted. This requirement establishes the lowest frequency that will be transmitted, which happens to be around 425 MHz. On the other hand, if every bit was toggled, the highest data frequency of 2125 MHz would result. Thus, all permissible data patterns with have a frequency between these two ranges, not including sidebands.

As noted above, the amplitude differences are greatest at the high frequencies. For example, if two disk drives are powered by a 3V rail, the best amplitude that could be expected at 2125 MHz may be about 2.7V. If one of the transmission line paths is short, the signal may drop by only 1 dB (e.g. to 2.5V), while a long transmission line path may drop by 12 dB (e.g. to 0.7V). Therefore, at high frequencies, where the long paths have significant loss as compared to the short paths, it is easier to compare the two paths. Thus, in a FC embodiment, the filter 430 may be a bandpass filter that only passes frequencies at around 2125 MHz. Referring again to FIG. 5, the effect of this filter is to have a bandpass region 502 around 2125 MHz.

Referring again to FIG. 4, as data flows through the transmission lines 416 and 418, certain patterns will generate frequencies at 2125 MHz that pass through filter 430. The energy at those frequencies will charge up an envelope detector 432 within a path length determination circuit 450. In the example of FIG. 4, the envelope detector 432 is comprised of a rectifier in series with the signal and an integrator capacitor shunted to ground. However, other designs well-understood to those skilled in the art are possible. Note, however, that the envelope detector design must allow an element such as a capacitor to charge up and hold its charge during continuous monitoring, to determine the peak envelope (amplitude of the voltage). The output of the envelope detectors 432 is a DC voltage equivalent to the peak value of the amplitude of the data frequency component desired. At this point, the path with the largest loss (the long path) will have significantly less voltage amplitude that the short path.

The two peak voltages from each of the envelope detectors 432 are fed into comparator 434 within the path length determination circuit 450, whose output provides an indication of which of the paths is the most highly attenuated, and therefore, which is the longer path. In particular, if the output of the comparator is a high voltage, the shorter path is transmission line 416 (and the longer path is transmission line 418), and if the output is a low voltage, the shorter path is transmission line 418 (and the longer path is transmission line 416). It should be noted, however, that the longer and shorter path determinations are only relative to each other, and do not provide any indication of actual length. For example, if the server blade 402 is plugged into an end slot on the midplane 404, the difference in length between the two transmission lines 416 and 418 may be large, and clearly one path is long compared to the other. However, if the server blade 402 is plugged into a middle slot on the midplane 404, the difference in length between the two transmission lines 416 and 418 may be small, yet one medium length path will be considered the longer path and the other will be considered the shorter path. Furthermore, depending on the locations of the I/O switches 410 and 412, the two transmission lines 416 and 418 may both be very short and nearly identical in length, yet one will be considered to be the longer path. Conversely, the two transmission lines 416 and 418 may both be very long and nearly identical in length, yet one will be considered to be the shorter path.

To provide a better estimation of actual path lengths, the outputs of the envelope detectors 432 can also be fed into a differential amplifier 436 to amplify and scale the difference in the paths. If the server blade 402 is in a slot near the end of the midplane 404, the two paths are more likely to be significantly different in length, and the output of the differential amplifier 436 is more likely to be large as compared to when the server blade 402 is inserted into a middle slot and the paths are more likely to be closer in length.

Setting a threshold 438 on a second comparator 440 and comparing it to the output of the differential amplifier 436 can also provide an indication of the location of the receiving device as compared to the location represented by the threshold. For example, a receiving device located near an end of the midplane 404 may have large path length differences that shows up as a large voltage (e.g. 3V) on the output of the differential amplifier 436, a receiving device located near the middle of the midplane may have small path length differences that shows up as a small voltage (e.g. 0.3V) on the output of the differential amplifier, and a receiving device located halfway between the end and the middle of the midplane (a "quarter" location) may have medium path length differences that shows up as a medium voltage (e.g. 1.5V) on the output of the differential amplifier. The threshold 438 can be set in advance to any of these voltages to represent any of these slot locations. When the comparator 440 compares the threshold 438 to the output of the differential amplifier, the slot location of the receiving device can be approximated. For example, if the threshold 438 is set to 1.5V (representing the "quarter" location) and connected to the − input of the comparator 440, and the output of the differential amplifier 436 is connected to the + input of the comparator, then if the output of the comparator is high, this is an indication that the receiving device is located nearer to the end of the midplane than the "quarter" location.

Once the longer and shorter path determination and the relative position determination has been made, this information may be converted to a digital value using A/D converters 454 and can be used by hardware 422 and/or processor 424 to set pre-emphasis settings for drivers/transmitters 446 in the return paths (which are typically approximately the same as the receive path lengths), and/or equalizer settings for the receivers 448. For example, the digital values generated by the A/D converters 454 may cause the hardware 422 and/or processor 424 to set the receive circuit equalization 448 to one of 16 different values. In an alternative embodiment, the digital values may directly toggle certain bits that program an equalizer to provide more or less boost. In another alternative embodiment, these measurements could be taken once, at startup, and the pre-emphasis or equalization manually set at that point. In yet another alternative embodiment, instead of using the second comparator 440 to provide a relative position determination, the output of the differential amplifier 436 may be converted to a digital value using an A/D converter 454 and provided to the hardware or processor for making the relative position determination and pre-emphasis settings.

Embodiments of the present invention do not enable perfect equalization/pre-emphasis, but it at least provides a rough indication of where the server blade 402 is plugged into the midplane 404 so the hardware 422 and/or processor 424 can set the equalization/pre-emphasis with some level of intelligence.

Figure 6:
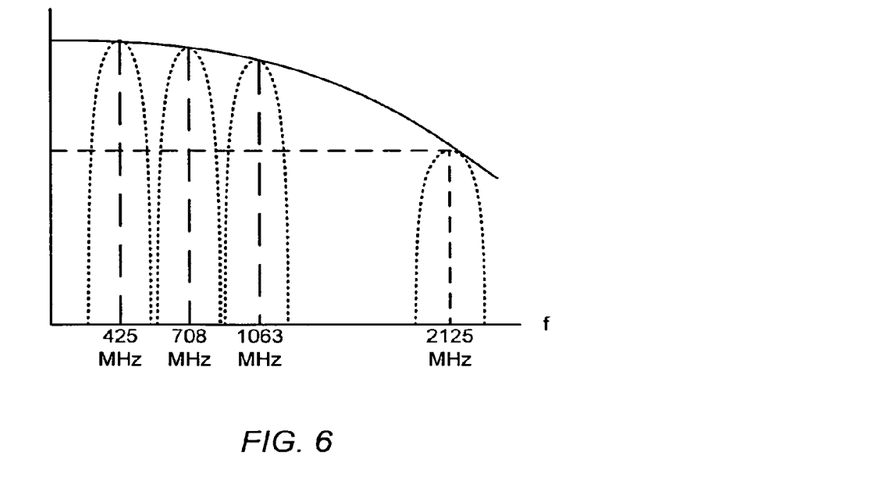
FIG. 6 is an illustration of an exemplary receiver and its rolled-off frequency response and bandpass filters at various frequencies for use in determining the actual frequency response and the proper equalization setting according to embodiments of the present invention.

Referring now to FIG. 6, which illustrates the frequency response of the long transmission line path 418 of FIG. 4 after amplification by amplifier 428, note that the frequency responses is different at different frequencies (e.g. 2125 MHz, 1063 MHz, 708 MHz, and 425 MHz). In an alternative embodiment of the present invention, a bandpass filter could be employed at a set of different frequencies along with an envelope detector to determine the amplitude at each of these frequencies. With this information, it is possible to determine the best equalization (e.g. which one of 16 possible settings) is needed to most closely compensate for the rolloff and make it flat.

Embodiments of the present invention described above are directed to a path length and slot estimation circuit for use where no slot identification circuitry is present. In alternative embodiments of the present invention described below, slot identification circuitry is disclosed that takes advantage of the fact that interface boards such as I/O switches are plugged into fixed positions in the midplane and connect to receiving devices such as controller cards or server blades via known fixed-length paths. Because the path length information is known, a path length or slot position indicator can be sent to the receiving devices via a unique common mode DC voltage across the FC (or other interface) transmission lines, allowing that device to know its path length or slot location so that it can determine pre-emphasis and or equalizations settings best suited for that path.

It should be understood that "in-band" communications (data streams added to faster data streams, using lower frequencies than the system Phase-Locked Loops (PLLs) can track) have been used in many applications. While the information in this alternative embodiment is traveling along a shared transmission line, there is no data stream involved as the information is a DC level (zero frequency, requiring DC blocks on the transmission lines) and it travels the lines in common mode, making interference with the FC data signal literally non-existent.

Figure 7:
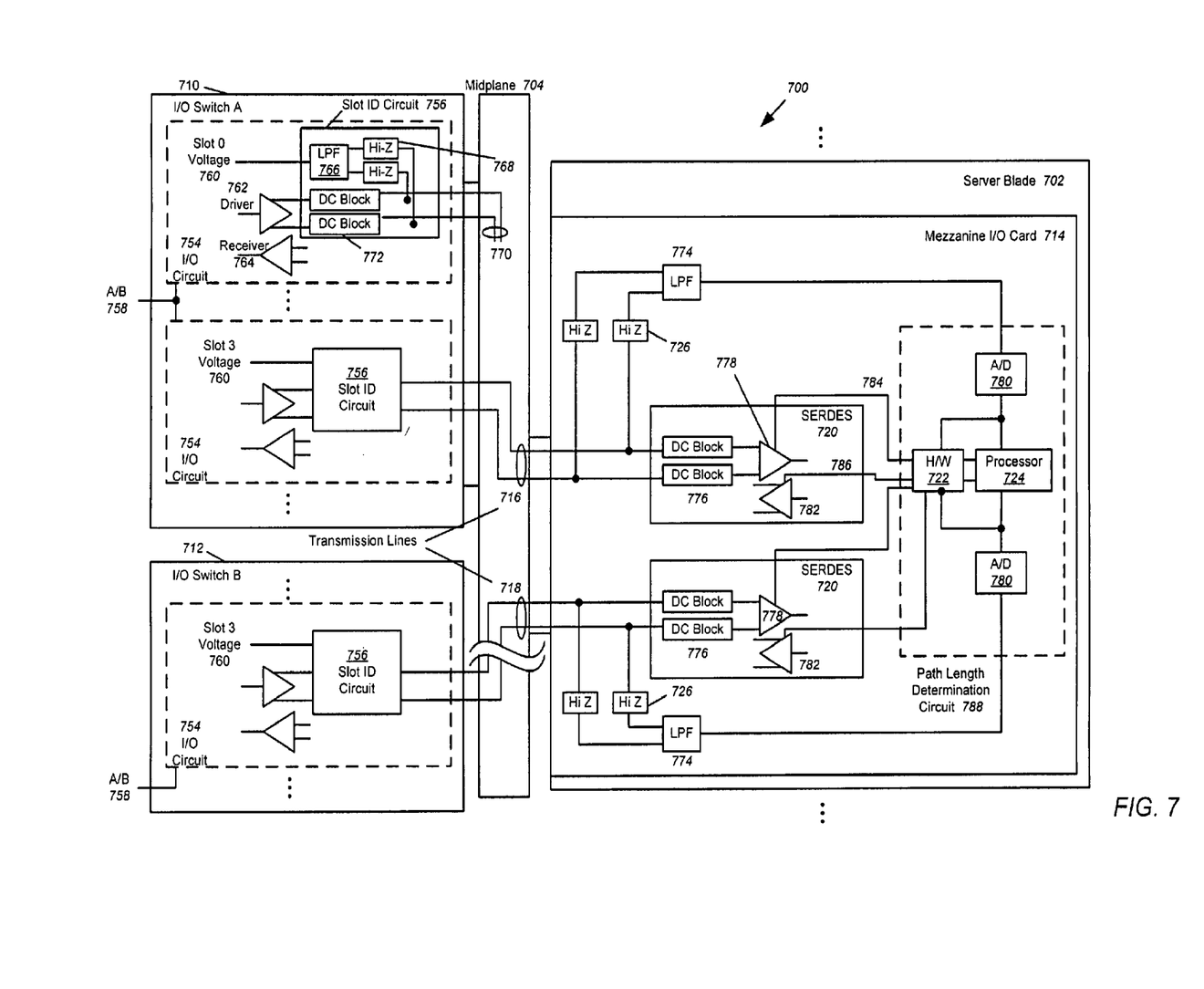
FIG. 7 is an illustration of an exemplary blade server and I/O switches employing a path identification circuit according to embodiments of the present invention.

FIG. 7 is an illustration of an exemplary blade server 700 with I/O switch A 710 and I/O switch B 712 and multiple server blades 702 (although only one is shown in FIG. 7), each I/O switch and server blade employing slot identification circuitry according to embodiments of the present invention. However, it should be understood that embodiments of the present invention are generally applicable to any system comprising two transmitting devices that transmit signals over a longer path and a shorter path to a receiving device. In the example of FIG. 7, the server blades 702, the "A" side I/O switch 710 and the "B" side I/O switch 712 are plugged into a midplane 704 within a blade server chassis. It should be understood that in SBOD or JBOD implementations, a blade server may comprise multiple disk drives instead of the multiple server blades 702 shown in FIG. 7, and would more properly be referred to as an SBOD or JBOD.

To enable the server blades 702 to communicate with a switch fabric through the redundant I/O switches 710 and 712, a mezzanine I/O card 714 that performs an HBA (a.k.a. IOC) function may be employed in each server blade 702. The connections to the mezzanine I/O card 714 include two differential I/O links (transmission lines) 716 and 718 routed from each of the two redundant I/O switches 710 and 712 through the midplane 704. Note that although only the mezzanine I/O card receive paths are illustrated in FIG. 7 for simplicity, the mezzanine I/O card 714 also includes drivers 782 for sending signals to the redundant I/O switches 710 and 712 over transmit paths (not shown). In addition, although FIG. 7 illustrates differential signals, embodiments of the present invention are also applicable to single-ended signals.

In the blade server 700 of FIG. 7 (or a JBOD, SBOD or any backplane/midplane system with dual paths), each of the redundant I/O switches A 710 and B 712 must have a priori information about which slot each pair of transmission lines are going to, because the traces in the midplane 704 must have been designed in advance. In other words, upon completion of the design phase for the midplane 704, the transmission line lengths are known for all connections between I/O switch A 710 and the slots on the midplane, and for all connections between I/O switch B 712 and the slots on the midplane. In one embodiment, both sets of path length information may be stored on an I/O switch in a memory device, which may include read-only memory, voltage dividers, or the like. After the I/O switch is plugged into either the A or B side, then a redundant I/O switch location identifier such as a switch 758 may be used to identify whether the I/O switch is plugged into the A or B side slot. Alternatively, the I/O switch may automatically identify its slot location after it is plugged into a slot by using a redundant I/O switch location identifier to read one or more slot location identification pins in the connector, or the redundant I/O switch location identifier may be a manually configured jumper which is installed before the I/O switch is inserted into a particular slot. Once the A or B side information is known, the correct A or B side information can be retrieved, and each I/O circuit 754 in the I/O switch can know precisely the path lengths that it is connected to. With this path length information, each I/O circuit 754 may set the pre-emphasis and or equalization for its driver 762 and receiver 764 accordingly.

On the other hand, because each server blade 702 can be plugged into any slot on the midplane 704, the server blades 702 do not know where their respective transmission lines are going. However, it would be desirable for the server blades 702 to identify the position or slot into which it has been inserted, or know the path length for signals received from the I/O switches across the midplane 704. With this information, the server blades 702 would be able to program optimized transmitter 782 and receiver 778 settings (pre-emphasis and/or equalization) for the data link.

To provide this path length information to the server blades 702 across the midplane 704 without utilizing dedicated pins and/or connectors, each of the redundant I/O switches 710 and 712 contains a slot IDentification (ID) circuit 756 in each of the I/O circuits 754 employed for facilitating communications between server blade slots in the blade server 700. Each I/O circuit 754 includes a driver 762 and receiver 764 pair and a slot ID circuit 756 coupled to the driver signal paths. The slot ID circuit 756 is fed by a slot voltage input 760, which provides an injected DC voltage representing the path length or slot number of the transmission line connecting the driver 762 to a slot on the other side of the midplane 704.

The slot ID circuit 756 will send a DC voltage in common mode along the FC (or other high speed serial interface) transmission lines, allowing the I/O switches to communicate path length or position or slot ID information to the server blades 702. In FIG. 7, I/O switch A 710 generates an agreed upon DC voltage 760 in each I/O circuit 754 for each of the paths it must communicate across, already knowing where those paths are routed. This may be accomplished using a Digital-to-Analog (D/A) converter, regulator, transistor, simple voltage divider, or the like. This DC voltage 760 (chosen at the time of the design of the circuit) corresponds to the information needed to be communicated. Each I/O circuit 754 may also communicate its own pre-emphasis and or equalization settings via the DC voltage value. The DC slot voltage 760 is first filtered via low pass filter 766 to remove any frequency (noise) components that might interfere with the desired data transmission, and is then coupled into the transmission lines 770 via high impedance elements 768. Elements 768 may be simply resistors, Radio Frequency (RF) chokes, bias T's, or any device capable of coupling in a DC voltage while having sufficiently high impedance at the desired data frequencies so as not to disturb the data communication. The transmission lines 770 must be DC blocked at 772 (typically using a coupling capacitor) in order to keep the common mode voltage from interfering with driver 762.

In the example of FIG. 7, one I/O circuit 754 in I/O switch A 710 coupled to slot 3 is shown, and one I/O circuit in I/O switch B 712 coupled to slot 3 is shown, for purposes of illustrating the alternative embodiment. The driver outputs from these I/O circuits travel the shorter path 716 and the longer path 718 and enter the mezzanine I/O card 714 on the server blade 702, where they are routed to a receiving circuit, typically a SERDES 720.

The injected common mode DC voltage is again DC blocked at 776 in order to prevent the DC voltage from interfering with receiver 778. Near the SERDES 720 the transmission lines 716 and 718 are sampled differentially by high impedance elements 726. These high impedance elements 726 are high enough impedance as compared to the impedance of the transmission lines 716 and 718 (on the order of 10× or more) so as to sample the data stream, but not disturb the data being received. The sampled injected DC voltage is then low pass filtered by filter 774 and converted to a digital value by A/D converter 780 with the path length determination circuit 788. Note that A/D converter 780 could also be implemented in a window comparator. Once the hardware 722 and/or processor 724 within the path length determination circuit 788 receives the digital value, it can determine the path length and how much pre-emphasis and or equalization is needed on its side of the link. Hardware 722 and/or processor 724 can then independently program the drivers 778 and/or receivers 782 of each SERDES 720 with the appropriate values via control signals 784 and 786, respectively, to equalize the path losses and provide minimum bit error rate across its links.

The slot identification circuitry in the server blade 702 according to alternative embodiments of the present invention is shown surrounding the SERDES 720 in the example of FIG. 7. However, it should be understood that although the slot identification circuitry is shown in FIG. 7 within the mezzanine I/O card 714, it may be located in other locations on the server blade 702 or receiving device.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for generating path length information for a first receive path and a second receive path, comprising:
   a first filter operably coupled to the first receive path;
   a second filter operably coupled to the second receive path different than the first receive path; and
   a path length determination circuit operably coupled to the first filter and the second filter, the path length determination circuit operable to measure path length information, the path length information including an indication of which paths of the first and second receive paths are the longer and shorter receive paths, and the path length determination circuit further operable to, based on the path length information, generate equalization information or pre-emphasis information.

2. The apparatus as recited in claim 1, the first and second signal characteristics being peak values of amplitudes of the first and second filtered signals, the path length determination circuit comprising:
   first and second envelope detectors coupled to the first and second filter outputs for generating DC voltages representative of the peak values of the amplitudes of the first and second filtered signals; and
   a first comparator coupled to each of the envelope detectors for receiving the DC voltages and outputting a voltage providing the indication of which paths of the first and second receive paths are the longer and shorter receive paths.

3. The apparatus as recited in claim 2, further comprising:
   one or more first and second high impedance elements coupled to each of the first and second receive paths or sensing the communication signals on each of the first and second receive paths; and
   first and second amplifiers coupled to the one or more first and second high impedance elements and the first and second filters or boosting the sensed communication signals.

4. The apparatus as recited in claim 3, the path length information including a magnitude of a difference between the longer and shorter of the first and second receive paths, the path length determination circuit further comprising a differential amplifier, coupled to each of the first and second envelope detectors or generating a voltage representative of the magnitude of the difference between the longer and shorter of the first and second receive paths.

5. The apparatus as recited in claim 4, further comprising a second comparator coupled to the differential amplifier and to a threshold reference voltage or indicating a location of a receiving device.

6. The apparatus as recited in claim 5, further comprising:
   first and second receivers coupled to each of the first and second receive paths; and
   first and second equalization circuits or adjusting a frequency response of the first and second receive paths;
   wherein the path length determination circuit further comprises
      a first Analog to Digital (A/D) converter coupled to the first comparator for converting the indication of which paths of the first and second receive paths are the longer and shorter paths into a first digital value,
      a second A/D converter coupled to the second comparator or converting the indication of the location of the receiving device into a second digital value, and
      a circuit coupled to the first and second A/D converters and the first and second equalization circuits for flattening out the frequency response of each of the first and second receive paths in accordance with the first and second digital values.

7. The apparatus as recited in claim 4, further comprising:
   first and second receivers coupled to each of the first and second receive paths; and
   first and second equalization circuits or adjusting a frequency response of the first and second receive paths;
   wherein the path length determination circuit further comprises
      a first Analog to Digital (A/D) converter coupled to the first comparator for converting the indication of which paths of the first and second receive paths are the longer and shorter paths into a first digital value,
      a second A/D converter coupled to the differential amplifier for converting the magnitude of the difference between the longer and shorter of the first and second receive paths into a second digital value, and
      a circuit coupled to the first and second A/D converters and the first and second equalization circuits for flattening out the frequency response of each of the first and second receive paths in accordance with the first and second digital values.

8. The apparatus as recited in claim 2, wherein the first and second filtered signals are within a frequency range of interest, the frequency range of interest including those frequencies at which the longer of the first and second receive paths has significant loss as compared to the shorter of the first and second receive paths.

9. The apparatus as recited in claim 2, wherein the first and second filtered signals are within a frequency range of interest, the frequency range of interest including the highest frequencies possible for a communication protocol being utilized over the first and second receive paths.

10. The apparatus as recited in claim 2, further comprising:
    first and second receivers coupled to each of the first and second receive paths; and
    first and second equalization circuits or adjusting a frequency response of the first and second receive paths;
    wherein the path length determination circuit further comprises
       a first Analog to Digital (A/D) converter coupled to the first comparator for converting the indication of which paths of the first and second receive paths are the longer and shorter paths into a first digital value, and
       a circuit coupled to the first A/D converter and the first and second equalization circuits for flattening out the frequency response of each of the first and second receive paths in accordance with the first digital value.

11. A mezzanine I/O card comprising the apparatus of claim 2.

12. A server blade comprising the mezzanine I/O card of claim 11.

13. A blade server comprising the server blade of claim 12.

14. A Storage Area Network (SAN) comprising the blade server of claim 13.

15. The apparatus as recited in claim 1, wherein the path length determination circuit further comprises circuitry utilizing the path length information to set equalization or pre-emphasis in a receiver or a transmitter.

16. A method for generating path length information for a first receive path and a second receive path, comprising:
    filtering a communication signal received on the first receive path and passing a first filtered signal having a first signal characteristic representative of a length of the first receive path;
    filtering a communication signal received on the second receive path and passing a second filtered signal having a second signal characteristic representative of a length of the second receive path, the second receive path being different than the first receive path;
    generating path length information from the first and second signal characteristics, the path length information including an indication of which paths of the first and second receive paths are the longer and shorter receive paths; and generating equalization information or pre-emphasis information based on the path length information.

17. The method as recited in claim 16, the first and second signal characteristics being peak values of amplitudes of the first and second filtered signals, the method further comprising:
- performing envelope detection on the first and second filtered signals;
- generating DC voltages representative of the peak values of the amplitudes of the first and second filtered signals; and
- comparing the generated DC voltages and indicating which paths of the first and second receive paths are the longer and shorter receive paths.

18. The method as recited in claim 17, further comprising:
- sensing the communication signals on each of the first and second receive paths in a non-disruptive manner; and
- amplifying the sensed signals in each of the receive paths prior to filtering.

19. The method as recited in claim 17, the path length information including a magnitude of a difference between the longer and shorter of the first and second receive paths, the method further comprising differentially amplifying each of the generated DC voltages for generating a voltage representative of the magnitude of the difference between the longer and shorter of the first and second receive paths.

20. The method as recited in claim 19, further comprising comparing the voltage representative of the magnitude of the difference between the longer and shorter of the first and second receive paths to a threshold reference voltage for indicating a location of a receiving device.

21. The method as recited in claim 20, further comprising:
- converting the indication of which paths of the first and second receive paths are the longer and shorter paths into a first digital value;
- converting the indication of the location of the receiving device into a second digital value; and
- equalizing a frequency response of each of the first and second receive paths in accordance with the first and second digital values.

22. The method as recited in claim 19, further comprising:
- converting the indication of which paths of the first and second receive paths are the longer and shorter paths into a first digital value;
- converting the magnitude of the difference between the longer and shorter of the first and second receive paths into a second digital value; and
- equalizing a frequency response of each of the first and second receive paths in accordance with the first and second digital values.

23. The method as recited in claim 17, wherein the first and second filtered signals are within a frequency range of interest, the frequency range of interest including those frequencies at which the longer of the first and second receive paths has significant loss as compared to the shorter of the first and second receive paths.

24. The method as recited in claim 17, wherein the first and second filtered signals are within a frequency range of interest, the frequency range of interest including the highest frequencies possible for a communication protocol being utilized over the first and second receive paths.

25. The method as recited in claim 17, further comprising:
- converting the indication of which paths of the first and second receive paths are the longer and shorter paths into a first digital value; and
- equalizing a frequency response of each of the first and second receive paths in accordance with the first digital value.

26. The method as recited in claim 16, further comprising:
- utilizing the path length information to set equalization or pre-emphasis in a receiver or a transmitter.

* * * * *